United States Patent
Manders et al.

(10) Patent No.: US 7,055,898 B2
(45) Date of Patent: Jun. 6, 2006

(54) ROOF ASSEMBLY FOR A VEHICLE

(75) Inventors: Peter C. L. J. Manders, Horst (NL); Egbert Boersma, Helmond (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/510,852

(22) PCT Filed: Apr. 12, 2002

(86) PCT No.: PCT/NL02/00239

§ 371 (c)(1),
(2), (4) Date: Oct. 12, 2004

(87) PCT Pub. No.: WO03/086798

PCT Pub. Date: Oct. 23, 2003

(65) Prior Publication Data

US 2005/0116512 A1      Jun. 2, 2005

(51) Int. Cl.
*B60J 7/57* (2006.01)
*B60J 7/19* (2006.01)
*B60J 7/53* (2006.01)

(52) U.S. Cl. .................. 296/222; 296/223; 296/224

(58) Field of Classification Search .......... 296/216.03, 296/216.05, 220.01, 221–224
See application file for complete search history.

(56) References Cited

U.S. PATENT DOCUMENTS 6,325,453 B1 * 12/2001 Manders ................. 296/223
6,390,544 B1 * 5/2002 Manders et al. ........... 296/223
6,394,540 B1 * 5/2002 Manders .................. 296/223
6,419,310 B1 * 7/2002 Manders .................. 296/223
6,494,529 B1 * 12/2002 Manders .................. 296/222

* cited by examiner

Primary Examiner—Dennis H. Pedder
(74) Attorney, Agent, or Firm—Westman, Champlin & Kelly; Todd R. Fronek

(57) ABSTRACT

A roof assembly for a vehicle, having an opening (1) in its fixed roof (2), comprises a frame and a closure element (4) which can be adjusted by means of an adjusting mechanism (5) including a driving slide (6). The closure element is at least movable between a closed position for closing the roof opening, and an open position, in which the roof opening is at least partially released. The frame (3) is fitted with at least one longitudinal guide track (7). The closure element (4) is supported near its front side by a front support (11–13) which is movably guided by said longitudinal guide track (7), and which is supported rearwards thereof by a lifting device (8–10). The lifting device including a closure guide curve (8) and a track guide curve (9) as well as a guide member (10) connected to the driving slide (6) and slidably in engagement with said guide curves (8, 9) to cause a height adjustment of the closure element (4) upon a sliding movement of the driving slide (6) and guide member (10) relative to the guide curves (8, 9). The front support (11–13) comprises a front closure guide curve (11) and a front track guide curve (12) as well as a front guide member (13) which is connected to the driving slide (6) and which is slidably in engagement with both front guide curves (11, 12) in order to cause a height adjustment of the front side of the closure element (4).

10 Claims, 7 Drawing Sheets

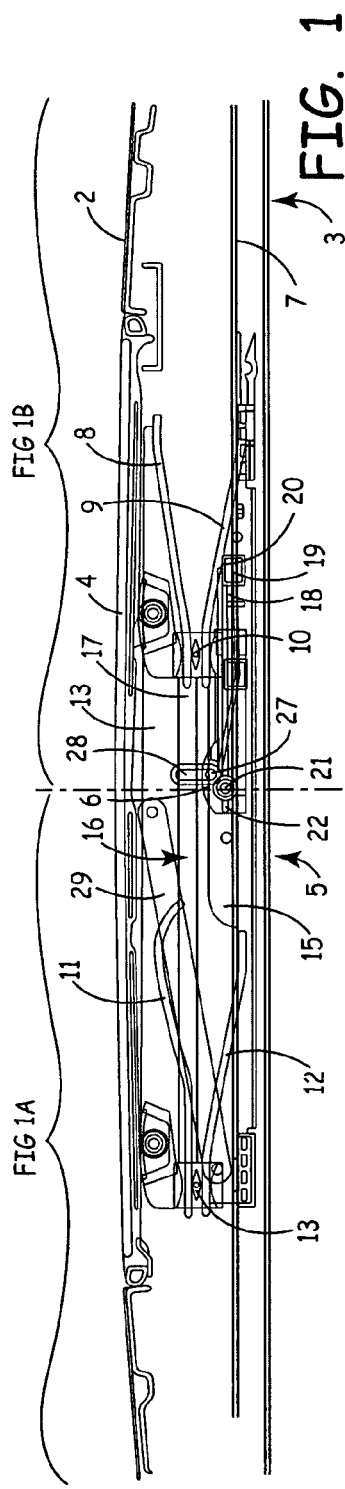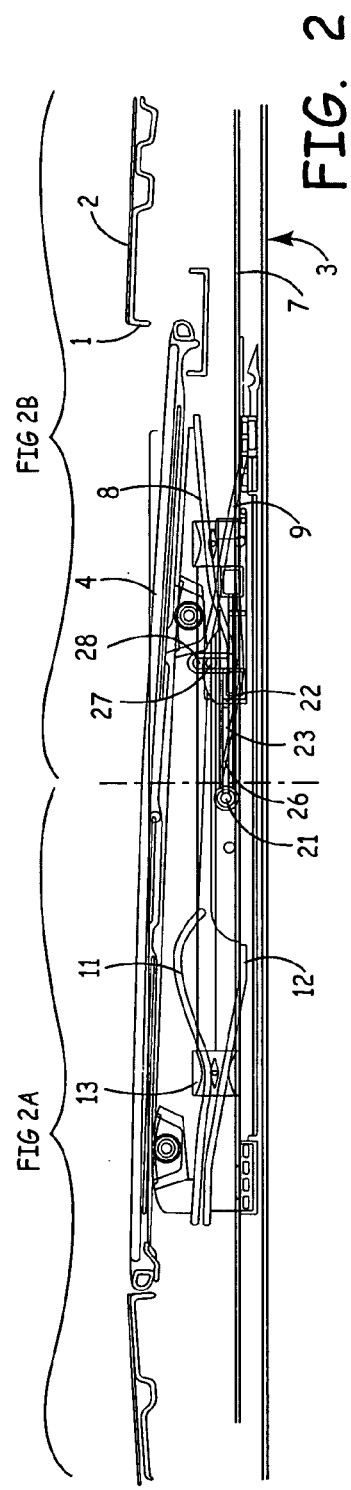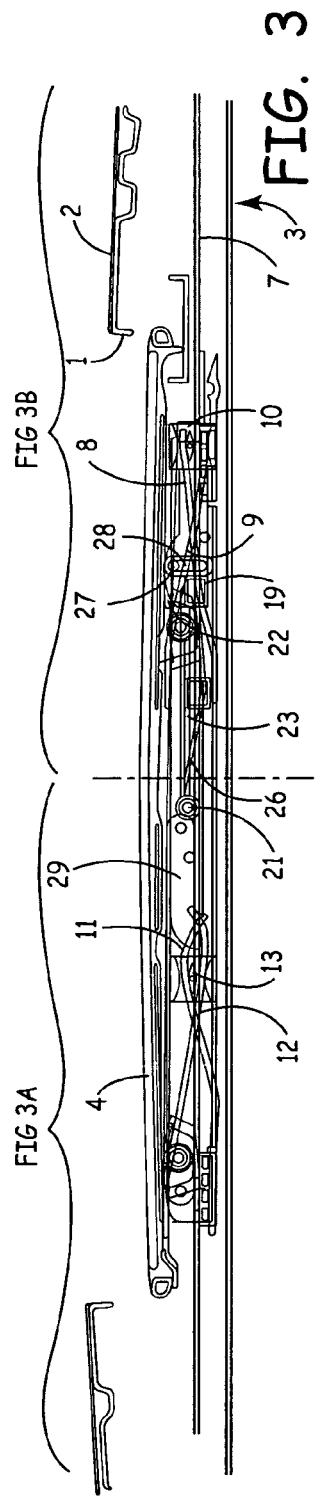

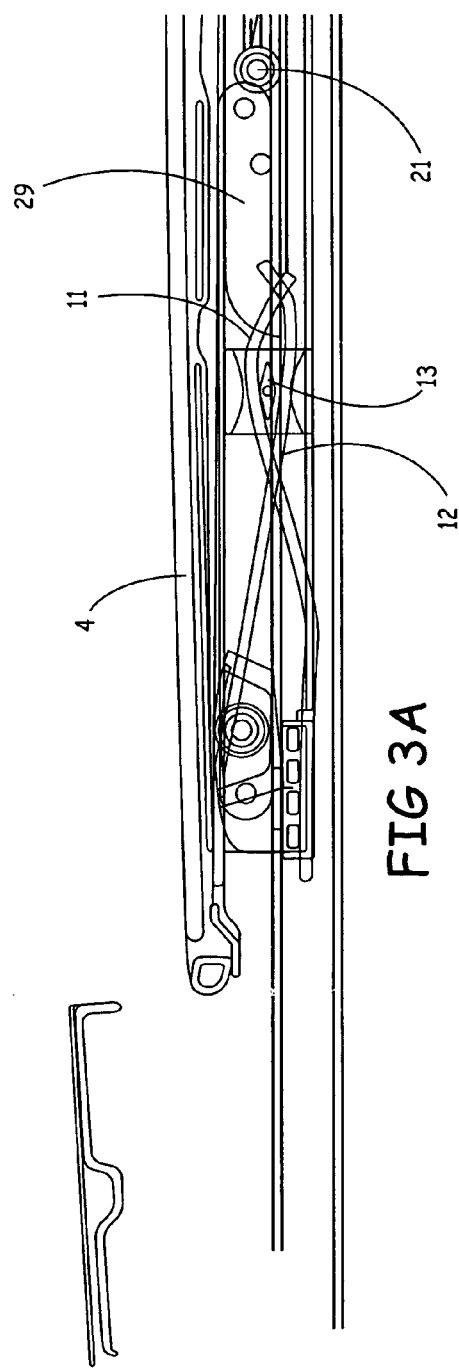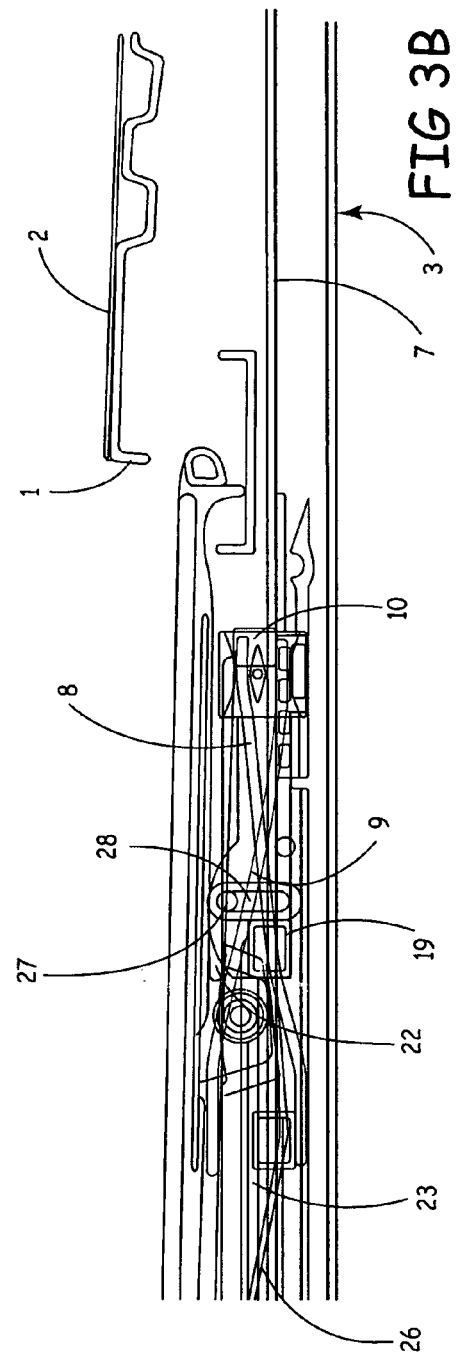

ROOF ASSEMBLY FOR A VEHICLE

CROSS-REFERENCE TO RELATED APPLICATION

This Application is a Section 371 National Stage Application of International Application No. PCT/NL 02/00239, filed 12 Apr. 2002 and published as WO 03/086798 on 23 Oct. 2003, in English.

BACKGROUND OF THE INVENTION

The present invention relates to a roof assembly for a vehicle in accordance with the preamble of claim 1. Such a roof assembly is known, for example from WO 00/06403.

SUMMARY OF THE INVENTION

The object of the present invention is to provide a new roof assembly of the kind referred to in the introduction.

In order to accomplish that objective, the roof assembly according to the invention is characterized by the features defined in the characterizing portion of claim 1.

Due to the features of the invention, the movements of both the front and rear side of the closure element are controlled by a very reliable, stable and compact mechanism using a two guide curves and a slider. If desired, the movements of the front and rear side of the panel can freely and independently be programmed by the length and curvature of the curves.

Preferably, the guide member and the front guide member are provided on an integral element which is pivotally and vertically adjustable.

This feature reduces the number of parts, whereas the front and main guide members are controlled by the same element which minimizes play.

Conveniently, the integral element is constructed as a two-armed lever which is coupled to the driving slide through a pin-slot connection including a transverse pin and a slot extending substantially perpendicularly to the guide track.

This enables transmission of driving forces between the driving slide and the guide members parallel to the guide track but allowing movement of the two-armed lever to adapt to relative vertical movements of the guide members.

Preferably, the track guide curves are provided on a track guide slide which slides in the guide track when the closure element is operated in a sliding movement, whereas the front closure guide curve and the closure guide curve are provided on an integral link fixed to the closure element.

This further reduces the number of parts for the operating mechanism.

In a preferred embodiment there is provided a locking member, the locking member comprising a locking cam adapted to enter and leave a recess in the longitudinal guide track in a locking position of the track guide slide, and being linked to the track guide slide so as to allow movement of the locking member, the driving slide and the locking member being coupled through a control to cause movement of the locking member to and from the locking position, such as a pin-slot connection including a transverse pin and a slot extending such that relative displacement of the pin and slot causes movement of the locking member.

In a particular embodiment of the roof assembly of the invention, the closure curves and the track guide slide are connected to each other through an arm pivotally connected to both.

In this way, the closure curves, and hence the closure element, maintain more freedom to move in dependence of the guide members without the interference of a fixed pivot.

BRIEF DESCRIPTION OF THE DRAWINGS

The invention will hereafter be explained in more detail with reference to the drawings, showing an embodiment of the roof assembly according to the invention.

FIG. 1–3 are longitudinal sectional views of the vehicle roof showing the roof assembly in different positions.

FIG. 1A–3A are exploded views of the front portions of FIGS. 1–3, respectively and FIG. 1B–3B are exploded views of the rear portions of FIGS. 1–3, respectively.

DETAILED DESCRIPTION OF THE ILLUSTRATIVE EMBODIMENT

Figure 1A:
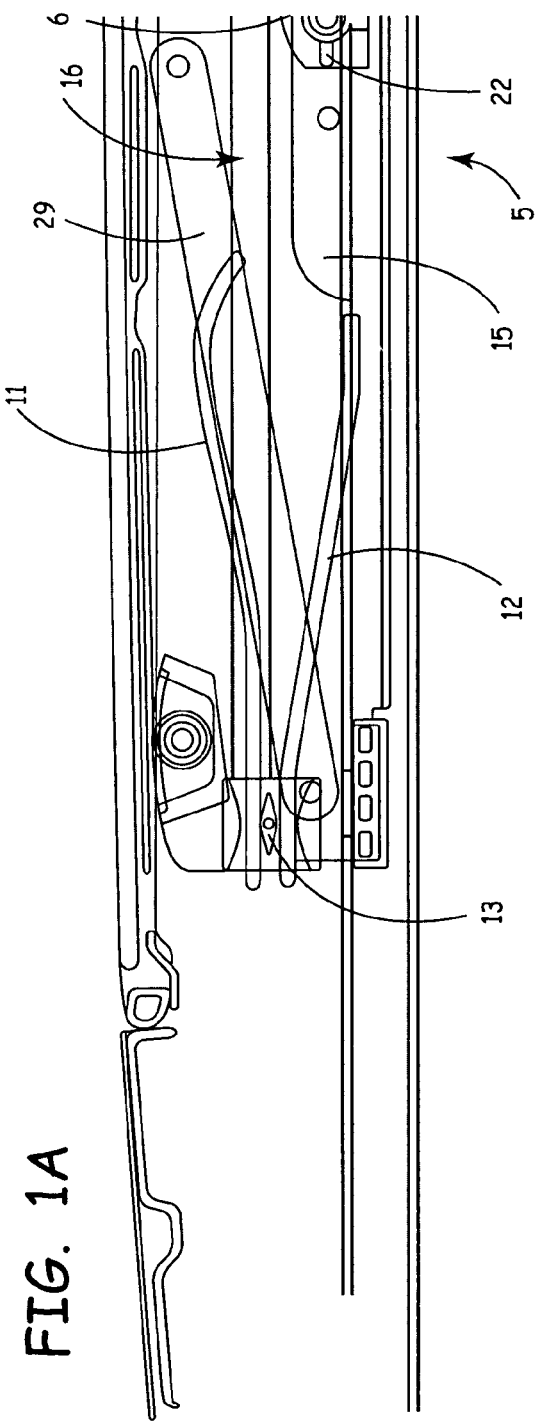
Figure 1B:
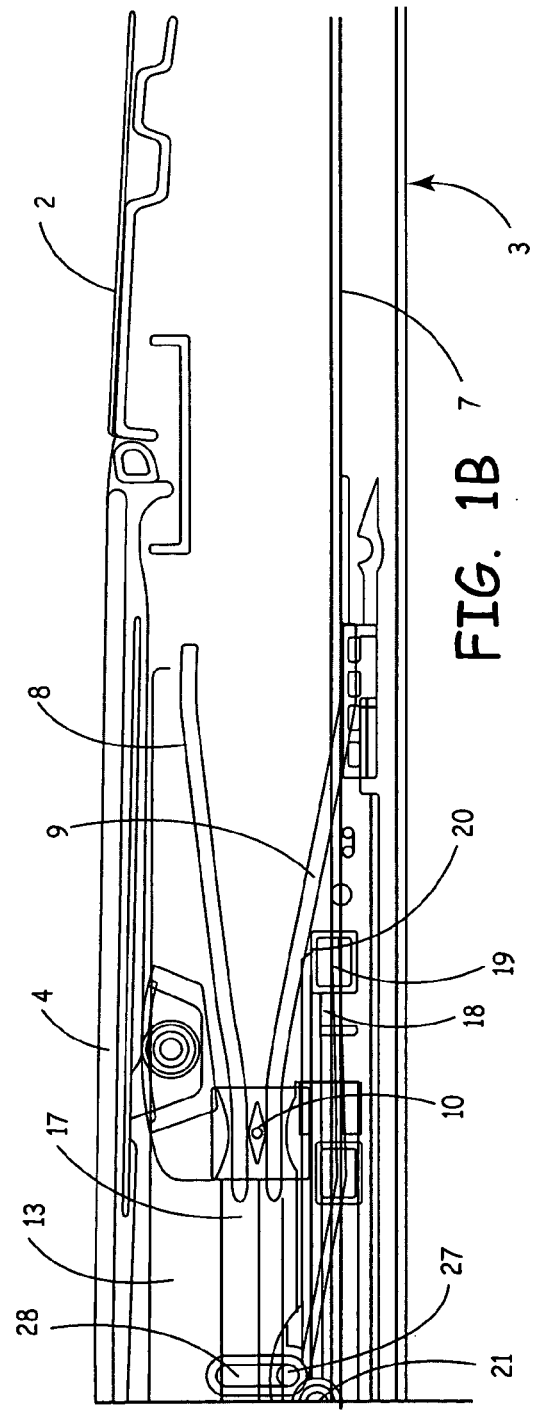
Figure 2A:
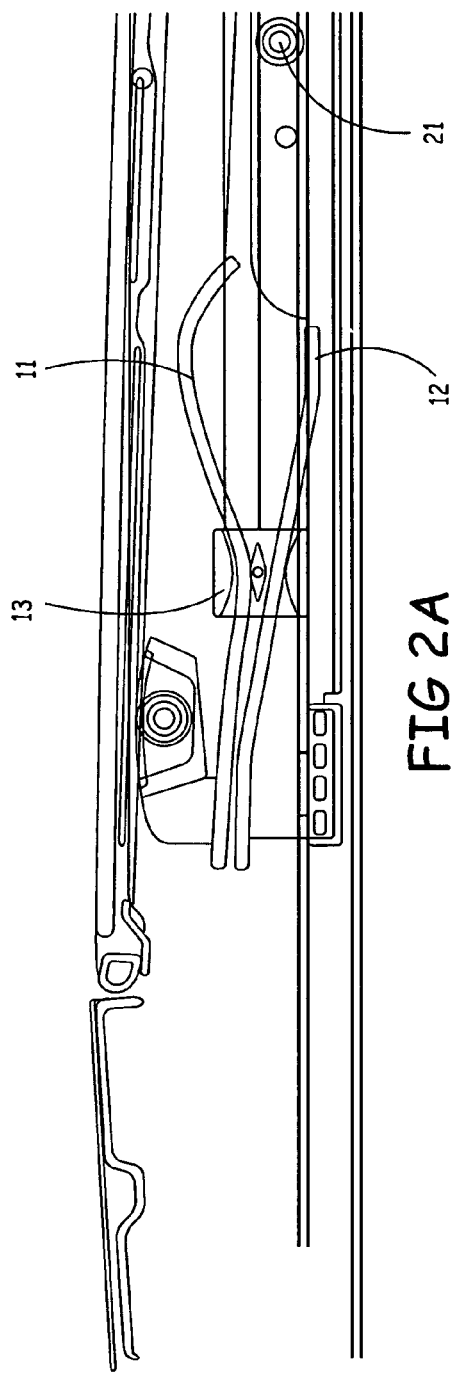
Figure 2B:
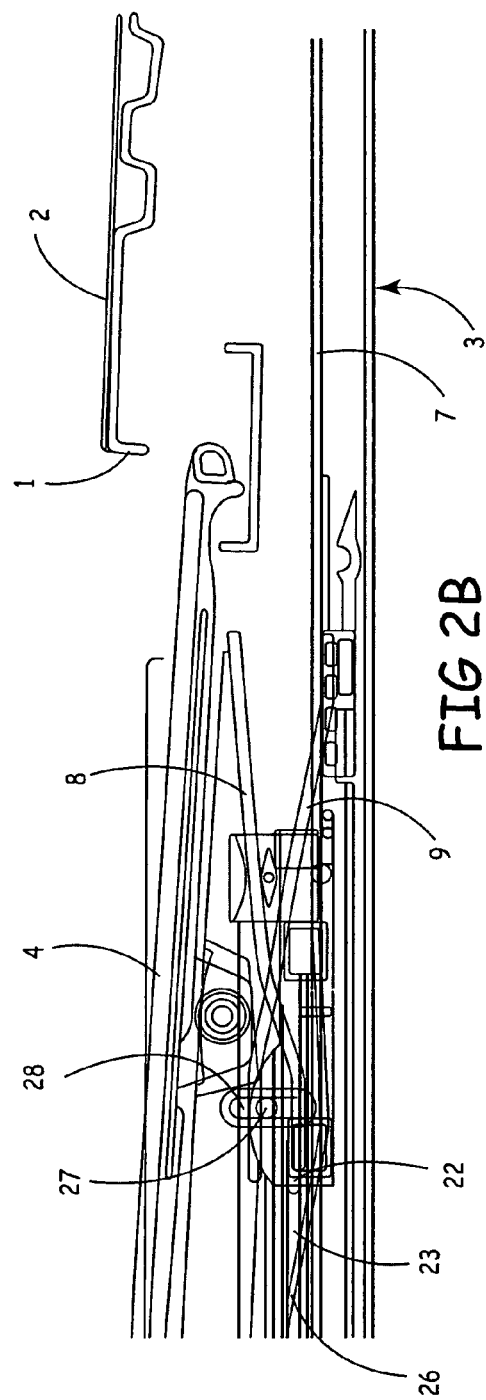

The drawings show an embodiment of a roof assembly for a vehicle, in particular a motor vehicle such as a passenger car. As is shown in FIG. 1–3, this vehicle is provided with an opening 1 in its fixed roof 2, whereby it is noted that said fixed roof 2 may either form part of the vehicle or of the roof assembly itself, which in that case makes up the entire roof of the vehicle. The fixed roof 2 may consist of an integral part of the vehicle or of one or more (transparent) panels, which may be removable or form a separate adjustable roof element.

The roof assembly comprises a stationary part, such as a frame 3, and a closure element, in this case in the form of a rigid and preferably transparent panel 4, for example made of glass or of plastic material, which is movably supported by frame 3. In this embodiment, panel 4 is movable between a closed position, in which roof opening 1 is closed and panel 4 is at least substantially coplanar with the fixed roof 2 (FIG. 1) and a downwardly moved (dropped) position in which the panel 4 is below the level of the fixed roof 2 (FIG. 3). Furthermore, the panel 4 is movable between this dropped position and an open position, in which panel 4 occupies a rearward position, at least partially below the fixed roof 2, in which a part of opening 2 is cleared (not shown).

An adjusting mechanism 5 is provided on each longitudinal side of panel 4 for effecting the movements of panel 4. The mechanism 5 is driven by a driving slide 6 coupled to a driving element, such as a driving cable and a manual actuator, such as a crank, or a motor such as an electric motor, for driving the cable. The mechanism 5 supports panel 4 and is at least partially guided in a longitudinal guide track 7 extending alongside the roof opening and further rearward.

Figure 4:
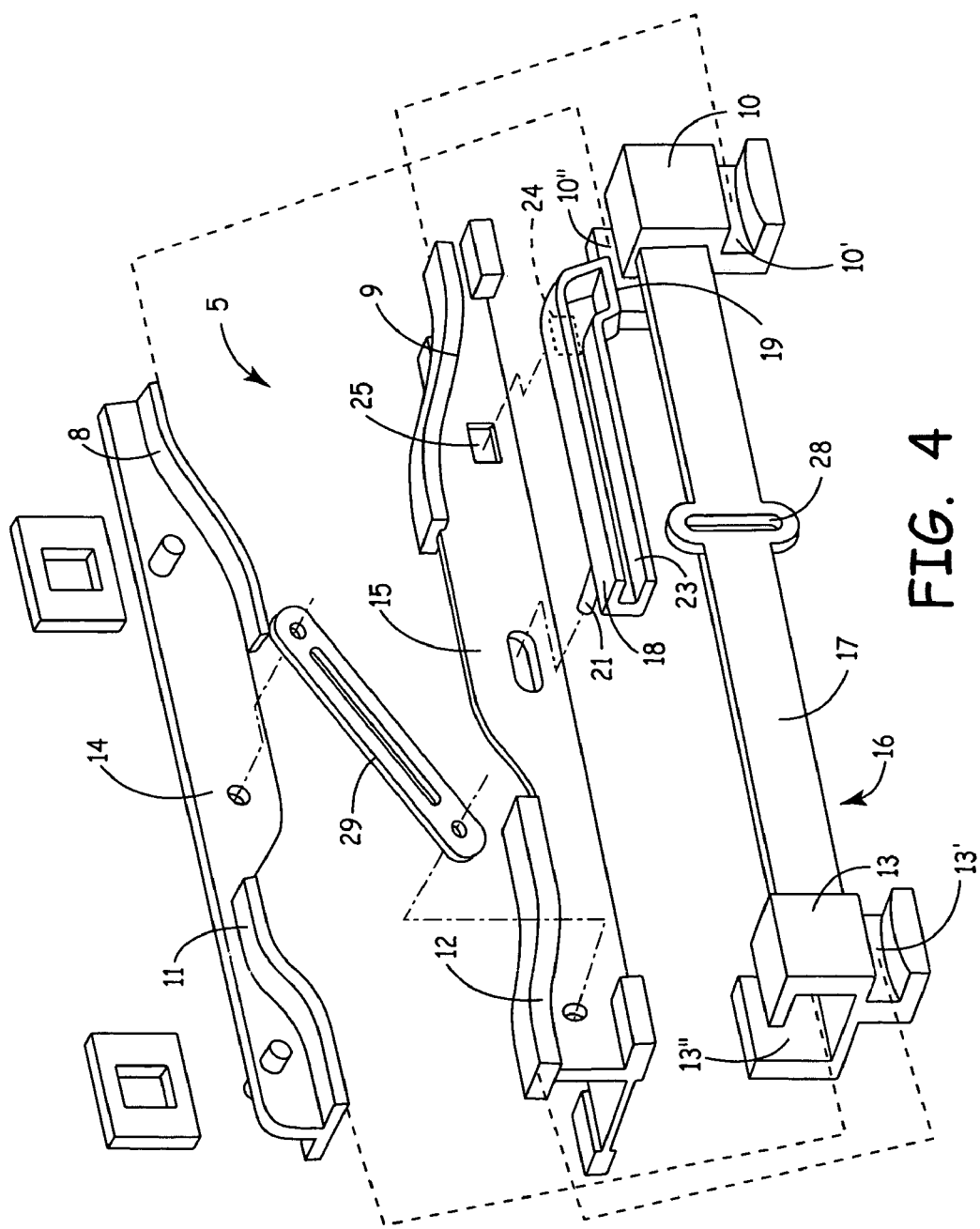
FIG. 4 is a simplified perspective exploded view of one adjusting mechanism of the roof assembly front of FIGS. 1–3.

The adjusting mechanism 5 for adjusting the panel 4 comprises a rear mechanism for vertically moving the rear side of the panel 4 and a front mechanism for vertically the front side of the panel. The rear mechanism includes a panel guide curve 8, a track guide curve 9 and a guide member 10 in engagement with both curves 8, 9. The front mechanism includes a front panel guide curve 11, a front track guide curve 12 and a front guide member 13 in engagement with both front curves 11, 12. Said mechanisms are known per se, for example from EP-A-1 046 529, but only used for the rear side of the panel. An additional difference is that, in the present case, the curves are all single (FIG. 4). The panel guide curves 8, 11 are formed on an integral panel link 14, whereas the track curves 9, 12 are provided on a single track guide slide 15. The panel and track guide curves 8, 9, 11, 12 are positioned such in transverse direction that they can move alongside each other (they can cross each other when viewed from the side).

The track guide slide 15 and the panel link 14 are interconnected by an arm 29 which is pivotally connected to both. This arm 29 takes care of the longitudinal interrelationship between the track guide slide 15 and the panel 4 now that there is no direct pivot connection between these elements.

The guide members 10, 13 are also formed as an integral element 16 including a portion 17 connecting both guide members. The driving slide 6 and the guide member element 16 are connected to each other at the position of the connecting portion 17 between the guide members 10, 13. This is effected by a pin 27 on the driving slide 6 and a short slot 28 extending substantially perpendicularly to the guide track 7. Due to this connection there is formed a two-armed lever, which is able to pivot and translate in vertical direction with respect to the driving slide 6 in order to adapt its position to the position of the guide members 10, 13 on the track guide curves 9, 12, while allowing the driving slide 6 to transmit a driving force to the guide members 10, 13.

The guide members 10, 13 and the guide curves 8, 9 and 11, 12 move relatively to each other only if the panel 4 is moved in vertical direction. During a sliding displacement of the panel 4, the guide members 10, 13 will be stationary with respect to their corresponding curves Guide member 10 includes channel 10' to engage curve 9 and channel 10" to engage curve 8. Furthermore, guide member 13 includes channel 13' to engage curve 12 and channel 13" to engage curve 11. Due to the engagement between the guide members 10, 13 and the driving slide 6, this will result in a driving connection between the driving slide 6 and the curves 8, 9, 11, 12 and, hence, the track guide slide 15 and the panel 4.

In order to obtain said operation, the driving slide 6 and the track guide slide 15 are coupled through a locking member 18 having two positions: a first position in which it locks the track guide slide 15 to the longitudinal guide track 7 and allows the driving slide 6 to slide with respect to the track guide slide 15, so that a vertical movement of the panel 4 is effected, and a second position in which it locks the driving slide 6 to the track guide slide 15 and allows the driving slide 6 and track guide slide 15 to slide as a unit with respect to the longitudinal guide track 7 so that the panel 4 is slid with respect to the longitudinal guide track 7.

Figure 5:
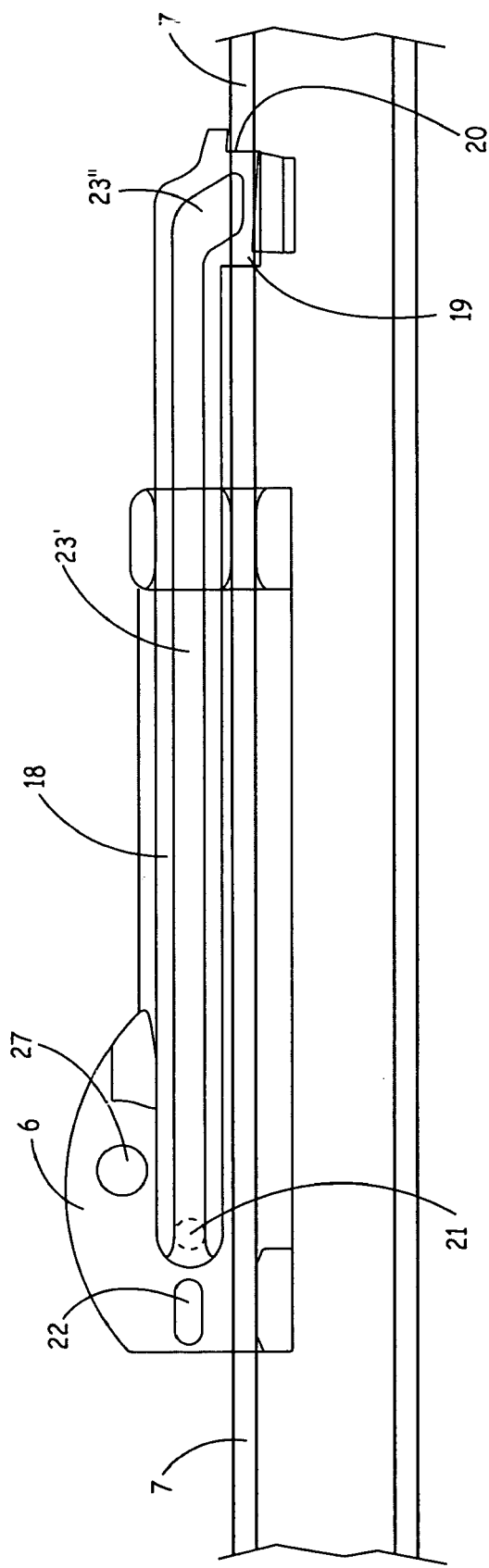
FIG. 5 is a schematic view of a portion of an adjusting mechanism in the roof assembly of FIGS. 1–3.

As illustrated in FIG. 5, to effect a locking action with respect to the longitudinal guide track 7, the locking member 18 includes a locking cam 19 adapted to enter and leave a locking recess 20 in the longitudinal guide track 7 in a locking position of the track guide slide 15 (in this case the front position). The locking cam 19 is linked to the track guide slide 15 so as to allow movement of the locking member 18, in this case pivotally attached through a pivot pin 21. The driving slide 6 and the locking member 18 are coupled through a control to cause movement of the locking member 18 to and from the locking position of the locking cam 19.

Figure 6A:
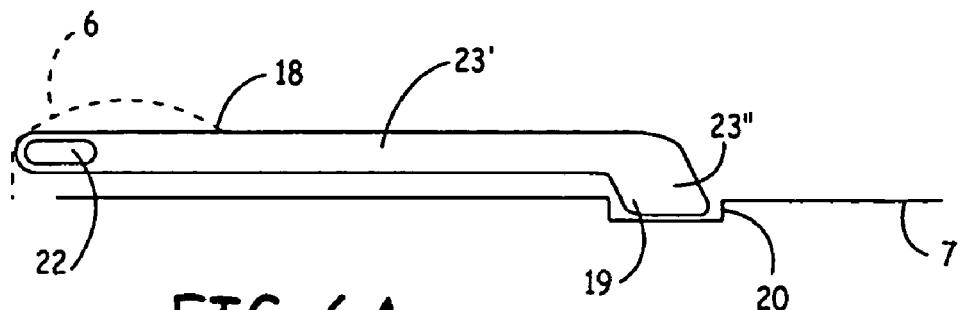
FIG 6A–6E are schematic views of operation of a control in the roof assembly of FIGS. 1–3.
Figure 6B:
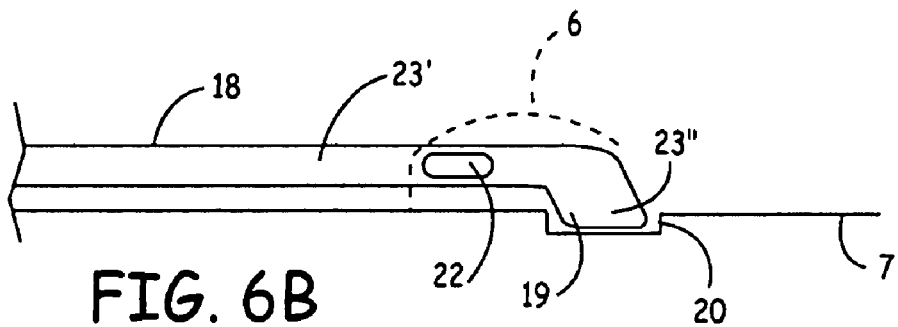
Figure 6C:
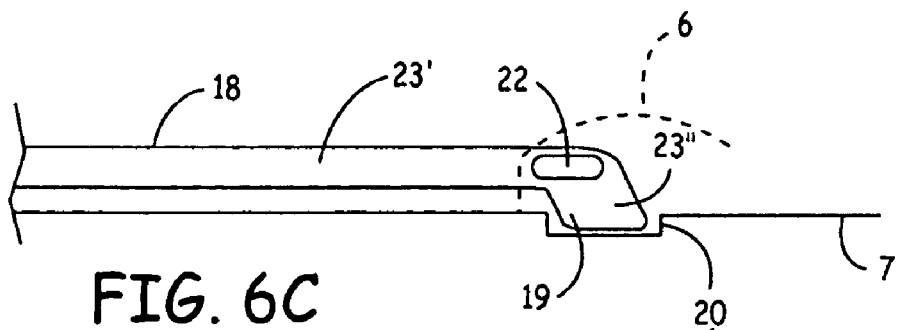
Figure 6D:
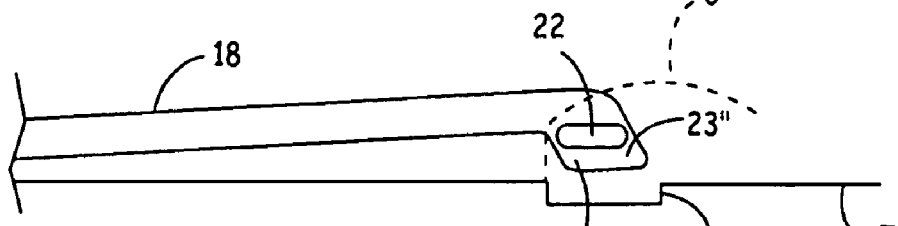
Figure 6E:
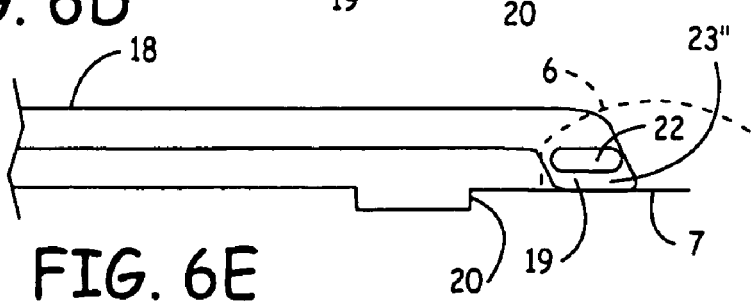

As illustrated in FIGS. 6A–GE, this control includes a pin-slot connection including a transverse cam or pin 22 and a slot 23 extending such that relative displacement of pin 22 and slot 23 results in a pivoting movement of the locking member 18 (see FIG. 6D). This pivoting movement only starts if the pin 22 is leaving a horizontal slot portion 23' allowing relative movement between driving slide 6 and track guide slide 15, and enters an inclined locking slot portion 23" causing a vertical displacement of the locking cam 19. If the locking cam 19 has left the recess 20 in the longitudinal guide track 7, the locking member 18 is free to move with respect to the longitudinal guide track 7 (for example, see FIG. GE).

On the other hand, the pin 22 of the driving slide 6 is locked in the locking slot portion 23" as long as the locking member 18 is not pivoted downwardly again. This is prevented by the bottom of the guide track 7 as long as the locking cam 19 is not registered with the recess 20 in the longitudinal guide track 7. A horizontal cam 24 on the locking member 18 positioned in the neighbourhood of the locking cam 19 engages in a recess 25 in the track guide slide 15 so as to allow limited vertical movement but prevents relative movement parallel to the track guide slide 15. This means that the track guide slide 15 is always locked with respect to the locking member 18 in sliding direction. Hence, in backwardly displaced positions of the panel 4, the driving slide 6 and the locking member 18 and consequently the track guide slide 15 (and thus the panel 4) will move as a unit.

A spring 26 acts on the locking member 18 such that it is loaded in downward direction, i.e. in a direction in which it is locked with respect to the longitudinal guide track 7.

From the foregoing it will be clear that the invention provides a roof assembly having a free programmable movement of both the front and rear side of the closure element, a small number of parts, a low packaging height, and a highly reliable design with proper force control. The adjusting mechanism is suitable to be used in multi-panel roof assemblies.

The invention is not restricted to the exemplary embodiment as described above and shown in the drawing, which can be varied in several ways without departing from the scope of the claims. For example, it is possible that the closure element is a non-transparent and/or non-rigid element, or the like. The roof assembly may also comprise several closure elements. The movement of the closure element may be chosen at will. For example, the closure element may be moved forwardly when it has been moved downwardly first. This will be particularly applicable in multi-panel roof assemblies. The closure element may also be of the tilt-type, tilt-slide type or of the spoiler type. A venting position may also be obtained by moving the front of the closure element downwardly and keeping the rear side of the closure element substantially stationary.

The invention claimed is:

1. A roof assembly for a vehicle having an opening (1) in its fixed roof (2), comprising a stationary part (3) attachable to the vehicle roof and at least one closure element (4) which is movably supported by said stationary part and which can be adjusted by means of an adjusting mechanism (5) including a driving slide (6), wherein said closure element, in use, is at least movable between a closed position for closing the roof opening, and an open position, in which the roof opening is at least partially released, wherein said stationary part (3) is fitted with at least one longitudinal guide track (7) extending in use at least along the roof opening (1), the closure element (4) being supported near its front side by a front support (11–13) which is movably guided by said longitudinal guide track (7), and which is supported rearwards thereof by a lifting device (8–10), said lifting device including a closure guide curve (8) and a track guide curve (9) as well as a guide member (10) connected to the driving slide (6) and slidably in engagement with said guide curves (8, 9) to cause a height adjustment of the closure element (4) upon a sliding movement of the driving slide (6) and guide member (10) relative to the guide curves (8, 9), wherein the front support (11–13) comprises a front closure guide curve (11) and a front track guide curve (12) as well as a front guide member (13) which is connected to the driving slide (6) and which is slidably in engagement with both front guide curves (11, 12) in order to cause a height adjustment of the front side of the closure element (4).

2. The roof assembly according to claim 1, wherein the front guide curves (11, 12) have such curvatures that the front of the closure element (4) is lowered if the closure element (4) is opened.

3. The roof assembly according to claim 2, wherein the guide member (10) and the front guide member (13) are provided on an integral guide member element (16) which is pivotally and vertically adjustable.

4. The roof assembly according to claim 3, wherein the integral guide member element (16) is constructed as a two-armed lever which is coupled to the driving slide (6) through a pin-slot connection including a transverse pin (27) and a slot (28) extending substantially perpendicularly to the guide track (7).

5. The roof assembly according to claim 1, of the preceding claims, in which the adjusting mechanism is adapted to perform a sliding movement of the closure element, wherein the track guide curves (9, 12) are provided on a track guide slide (15) which slides in the guide track (7) when the closure element (4) is operated in a sliding movement.

6. The roof assembly according to claim 5, wherein the driving slide (6) and the track guide slide (15) are coupled through a locking member (18) having two positions: a first position in which it locks the track guide slide (15) to the longitudinal guide track (7) and allows the driving slide (6) to slide with respect to the track guide slide (15), and a second position in which it locks the driving slide (6) to the track guide slide (15) and allows the driving slide and track guide slide to slide as a unit with respect to the longitudinal guide track (7).

7. The roof assembly according to claim 6, wherein the locking member (18) includes a locking cam (19) adapted to enter and leave a recess in the longitudinal guide track (7) in a locking position of the track guide slide (15), and being linked to the track guide slide (15) so as to allow movement of the locking member (19), the driving slide (6) and the locking member (18) being coupled through a control (22, 23) to cause movement of the locking member to and from the locking position of the locking cam (19).

8. The roof assembly according to claim 7, wherein said control (22, 23) includes a pin-slot connection including a transverse pin (22) and a slot (23) extending such that relative displacement of the pin and slot causes movement of the locking member (18).

9. The roof assembly according to claim 1, wherein the closure curves (8, 11) and the track guide slide (15) are connected to each other through an arm pivotally connected to both.

10. The roof assembly according to claim 1, wherein the front closure guide curve (11) and the closure guide curve (8) are provided on an integral link (14) fixed to the closure element (4).

* * * * *